United States Patent
Grandi

(10) Patent No.: US 9,482,196 B2
(45) Date of Patent: Nov. 1, 2016

(54) METHOD FOR MONITORING AN INJECTION VALVE, AND METHOD FOR OPERATING AN INJECTION VALVE

(71) Applicant: Continental Automotive GmbH, Hannover (DE)

(72) Inventor: Mauro Grandi, Livorno (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 61 days.

(21) Appl. No.: 14/399,227

(22) PCT Filed: May 8, 2013

(86) PCT No.: PCT/EP2013/059624
§ 371 (c)(1),
(2) Date: Nov. 6, 2014

(87) PCT Pub. No.: WO2013/167675
PCT Pub. Date: Nov. 14, 2013

(65) Prior Publication Data
US 2015/0108238 A1    Apr. 23, 2015

(30) Foreign Application Priority Data
May 10, 2012    (EP) .................................... 12167414

(51) Int. Cl.
*F02D 41/22*    (2006.01)
*F02D 41/24*    (2006.01)
(Continued)

(52) U.S. Cl.
CPC .......... *F02M 51/061* (2013.01); *F02D 41/221* (2013.01); *F02D 41/2467* (2013.01);
(Continued)

(58) Field of Classification Search
CPC ............. F02M 51/061; F02M 57/005; F02M 41/221; F02M 41/2467; F02M 41/20; F02D 2041/2044; F02D 2041/2034; F02D 2041/2058; Y02T 10/40
See application file for complete search history.

(56) References Cited

U.S. PATENT DOCUMENTS

| 5,153,522 A | 10/1992 | Sano .............................. 324/546 |
| 6,394,414 B1 * | 5/2002 | Breitling ............... H01F 7/1844 251/129.04 |

(Continued)

FOREIGN PATENT DOCUMENTS

| CN | 102027221 A | 4/2011 | ............. F02D 41/00 |
| CN | 102318099 A | 1/2012 | ............. H01L 41/04 |

(Continued)

OTHER PUBLICATIONS

European Search Report, Application No. 12167414, 9 pages, Jan. 11, 2013.
(Continued)

*Primary Examiner* — Hieu T Vo
*Assistant Examiner* — Arnold Castro
(74) *Attorney, Agent, or Firm* — Slayden Grubert Beard PLLC

(57) ABSTRACT

A method is disclosed for monitoring an opening of an injection valve. The injection valve includes a valve body with a cavity having a fluid outlet portion, a valve needle movable in the cavity between a closing position preventing fluid flow outlet and other positions allowing fluid flow through the outlet, and an actuator unit for actuating the valve needle. The method includes actuating the actuator unit with a predetermined voltage signal, recording a time-dependent profile of a current through the actuator unit, detecting a first gradient alteration time where the gradient of the recorded current profile changes more than a first threshold, detecting a second gradient alteration time where the gradient of the recorded current profile changes more than a second threshold, and based on the first and second gradient alteration times determining a diagnostic value usable for compensating a long-term drift of the injection valve.

16 Claims, 3 Drawing Sheets

(51) Int. Cl.
*F02M 51/06* (2006.01)
*F02M 57/00* (2006.01)
*F02D 41/20* (2006.01)

(52) U.S. Cl.
CPC ............ *F02M57/005* (2013.01); *F02D 41/20* (2013.01); *F02D 2041/2034* (2013.01); *F02D 2041/2044* (2013.01); *F02D 2041/2058* (2013.01); *Y02T 10/40* (2013.01)

(56) References Cited

U.S. PATENT DOCUMENTS

| | | | | |
|---|---|---|---|---|
| 6,679,222 | B1* | 1/2004 | Reischl | F02D 41/2096 |
| | | | | 123/305 |
| 8,543,314 | B2* | 9/2013 | Nakata | F02D 41/2096 |
| | | | | 123/456 |
| 8,714,140 | B2 | 5/2014 | Borchsenius et al. | 123/494 |
| 8,766,509 | B2 | 7/2014 | Reichinger et al. | 310/314 |
| 9,103,294 | B2* | 8/2015 | Sujan | F02D 41/1495 |
| | | | | 123/305 |
| 2008/0148831 | A1 | 6/2008 | Kekedjian et al. | 73/116.01 |
| 2012/0101707 | A1 | 4/2012 | Kemmer et al. | 701/103 |
| 2014/0124601 | A1* | 5/2014 | Imai | F02D 41/20 |
| | | | | 239/585.1 |
| 2015/0068610 | A1* | 3/2015 | Sommerer | F02D 41/3863 |
| | | | | 137/12 |

FOREIGN PATENT DOCUMENTS

| | | | | |
|---|---|---|---|---|
| CN | 102405342 | A | 4/2012 | F02D 41/20 |
| DE | 4122348 | A1 | 1/1992 | G01R 31/06 |
| DE | 102009045307 | A1 | 4/2011 | F02D 41/20 |
| EP | 1895133 | A2 | 3/2008 | F02D 41/30 |
| JP | 2000179391 | A | 6/2000 | F02D 41/20 |
| WO | 94/13991 | A1 | 6/1994 | F02D 41/20 |
| WO | 2013/167675 | A1 | 11/2013 | F02D 41/22 |

OTHER PUBLICATIONS

International Search Report and Written Opinion, Application No. PCT/EP2013/059624, Jun. 12, 2013.
Chinese Office Action, Application No. 201380024394.8, 5 pages, May 26, 2016.

* cited by examiner

METHOD FOR MONITORING AN INJECTION VALVE, AND METHOD FOR OPERATING AN INJECTION VALVE

CROSS-REFERENCE TO RELATED APPLICATIONS

This application is a U.S. National Stage Application of International Application No. PCT/EP2013/059624 filed May 8, 2013, which designates the United States of America, and claims priority to EP Application No. 12167414.7 filed May 10, 2012, the contents of which are hereby incorporated by reference in their entirety.

TECHNICAL FIELD

The invention relates to a method for monitoring an injection valve. Furthermore, the invention relates to a method for operating an injection valve.

BACKGROUND

Injection valves are in wide spread use, in particular for internal combustion engines where they may be arranged in order to dose the fluid into an intake manifold of the internal combustion engine or directly into the combustion chamber of a cylinder of the internal combustion engine.

Injection valves are manufactured in various forms in order to satisfy the various needs for the various combustion engines. Therefore, for example, their length, their diameter and also various elements of the injection valve being responsible for the way the fluid is dosed may vary in a wide range. In addition to that, injection valves may accommodate an actuator for actuating a needle of the injection valve, which may, for example, be an electromagnetic actuator or a piezoelectric actuator.

In order to enhance the combustion process in view of the creation of unwanted emissions, the respective injection valve may be suited to dose fluids under very high pressures. The pressures may be in case of a gasoline engine, for example, in the range of up to 200 bar or even up to 400 bar and in the case of Diesel engines in the range of more than 2000 bar.

SUMMARY

One embodiment provides a method for operating an injection valve, the injection valve comprising a valve body with a cavity comprising a fluid outlet portion, a valve needle movable in the cavity and preventing a fluid flow through the fluid outlet portion in a closing position and releasing the fluid flow through the fluid outlet portion in further positions, and an actuator unit with a coil and an armature, the armature being movable in the cavity and being designed to actuate the valve needle, the method comprising the following steps: actuating the actuator unit by means of a predetermined voltage signal starting at a given starting time, recording a time-dependent profile of a current through the actuator unit, based on the recorded profile of the current and starting from the starting time detecting a first gradient alteration time where the gradient of the recorded profile of the current changes more than a first given threshold, the gradient between the starting time and the first gradient alteration time being representative for the energization of the coil, based on the recorded profile of the current and starting from the first gradient alteration time detecting a second gradient alteration time where the gra- dient of the recorded profile of the current changes more than a second given threshold, the gradient between the first gradient alteration time and the second gradient alteration time being representative for a movement of the armature alone, based on the recorded profile of the current and starting from the second gradient alteration time a third gradient alteration time is detected where the gradient of the recorded profile of the current changes more than a third given threshold, the gradient between the second gradient alteration time and the third gradient alteration time being representative for a common movement of the armature and the valve needle, and dependent from the first gradient alteration time and/or the second gradient alteration time and dependent from the third gradient alteration time, determining a diagnostic value, and using the diagnostic value for compensating a long-term drift of the injection valve.

In a further embodiment, the diagnostic value is determined dependent from the time difference between the starting time and the first gradient alteration time and/or the time difference between the starting time and the second gradient alteration time.

In a further embodiment, the diagnostic value is determined dependent from the time difference between the starting time and the third gradient alteration time.

In a further embodiment, the injection valve is an injection valve of an internal combustion engine and wherein, for a first injection process, the starting time is given relative to a given crank shaft angle of the internal combustion engine and the diagnostic value is used for adjusting an assignment rule for determining a signal duration time of the voltage signal for at least one further injection process.

In a further embodiment, the assignment rule for determining the signal duration time of the voltage signal is adjusted dependent from the time difference between the starting time and the first gradient alteration time and/or the time difference between the starting time and the second gradient alteration time.

In a further embodiment, dependent from the first gradient alteration time and/or the second gradient alteration time an assignment rule for determining a phase shift of the voltage signal relative to the given crankshaft angle is adjusted for at least one further injection process.

In a further embodiment, the injection valve is an injection valve of an internal combustion engine and wherein, for a first injection process, the starting time is given relative to a given crank shaft angle of the internal combustion engine and the diagnostic value is used for adjusting an assignment rule for determining a phase shift of the voltage signal relative to the given crank shaft angle for at least one further injection process.

In a further embodiment, the assignment rule for determining the time shift of the voltage signal relative to the given crank shaft angle is adjusted dependent from the time difference between the starting time and the first gradient alteration time and/or the time difference between the starting time and the second gradient alteration time.

BRIEF DESCRIPTION OF THE DRAWINGS

Example embodiments are explained below with reference to the drawings, in which.

DETAILED DESCRIPTION

Figure 1:
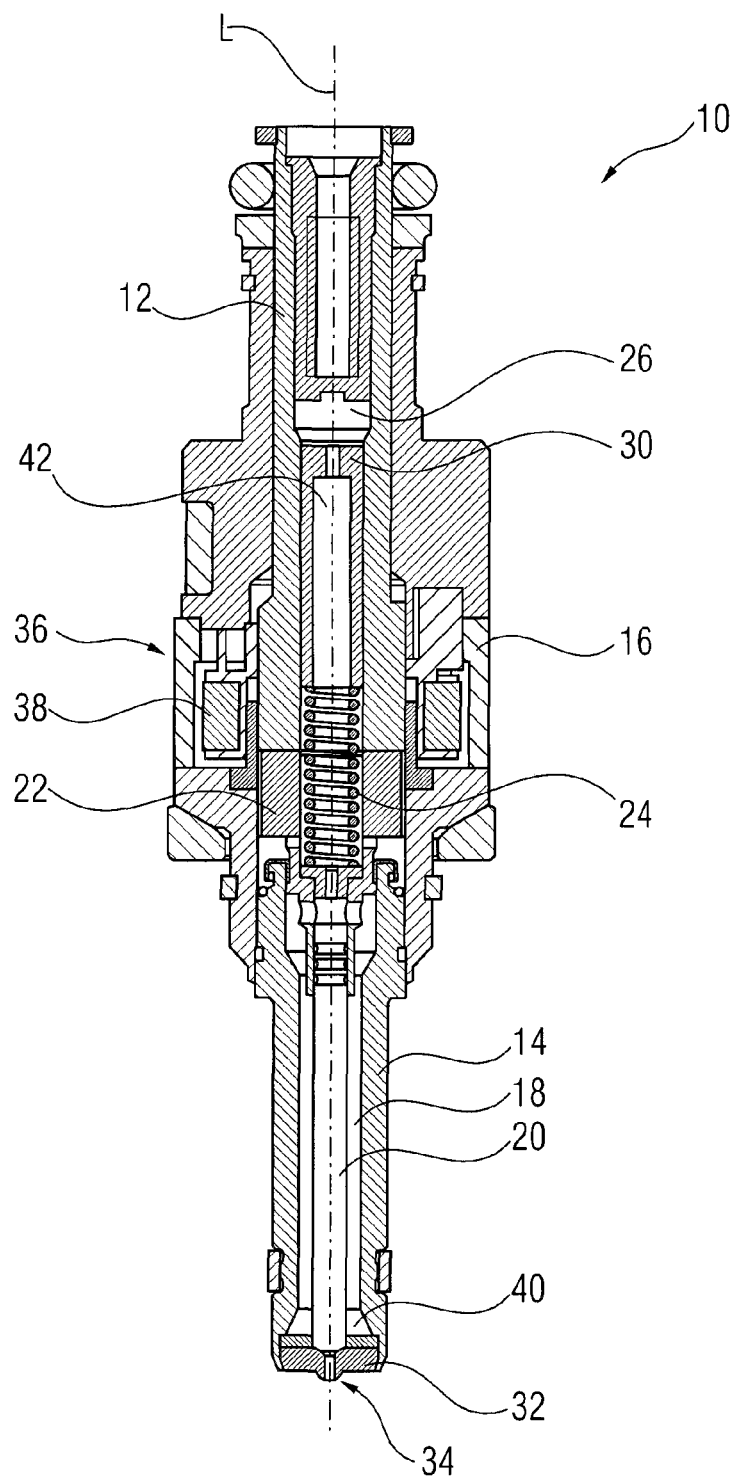
FIG. 1 shows an injection valve in a longitudinal section view.

Embodiments of the invention provide a method for monitoring an opening of an injection valve and a method for operating an injection valve which allow a reliable and precise operation of the injection valve.

Some embodiments provide a method for monitoring an opening of an injection valve. Other embodiments provide a method for operating an injection valve, e.g., an injection valve of an internal combustion engine.

The injection valve comprises a valve body with a cavity comprising a fluid outlet portion, a valve needle movable in the cavity and preventing a fluid flow through the fluid outlet portion in a closing position and releasing the fluid flow through the fluid outlet portion in further positions, and an actuator unit with a coil and an armature, the armature being movable in the cavity and being designed to actuate the valve needle.

The method may comprise the following steps: actuating the actuator unit by means of a predetermined voltage signal starting at a given starting time, recording a time-dependent profile of a current through the actuator unit, based on the recorded profile of the current and starting from the starting time detecting a first gradient alteration time where the gradient of the recorded profile of the current changes more than a first given threshold, based on the recorded profile of the current and starting from the first gradient alteration time detecting a second gradient alteration time where the gradient of the recorded profile of the current changes more than a second given threshold, and dependent from the first gradient alteration time and/or the second gradient alteration time determining a diagnostic value.

The diagnostic value may be representative for an erroneous respectively correct operation of the injection valve. A drift of the first gradient alteration time and/or the second gradient alteration time may indicate an erroneous operation of the injection valve. In the present context, a "drift" of a time is in particular a deviation from an expected—e.g. from a predetermined—position in time. The operation may in particular be erroneous if the respective drift(s) exceed a predetermined tolerance range.

A first gradient of the recorded profile of the current between the starting time and the first gradient alteration time is representative for an energization of the coil. A second gradient of the recorded profile of the current between the first gradient alteration time and the second gradient alteration time is representative for a movement of the armature separate from the valve needle. The thresholds may be determined in advance in a suitable manner, for example by tests at an engine test station or by simulations.

This method has the advantage that different phases of the operation of the injection valve during the opening of the injection valve may be identified. Consequently, a long-term drift of the behavior of the injection valve during the opening process of the valve needle may be detected, in particular a long-term drift of the first and/or second gradient alteration time. Furthermore, the monitoring of the dynamics of the injection valve may serve as abase for a compensation of the long-term drift of the injection valve. The expression "long-term drift" in the present context relates may in particular relate to changes on a time scale of the lifetime—in particular the mean time to failure (MTTF)—of the injection valve, for example in the range of at least 5% of the MTTF. The MTTF may be determined by standardized statistical procedures which are in principle known to the person skilled in the art.

In one embodiment the diagnostic value is determined dependent from the time difference between the starting time and the first gradient alteration time and/or the time difference between the starting time and the second gradient alteration time. In this way, it is uncomplicated to determine a drift of the first and second gradient alteration time, respectively.

In a further embodiment based on the recorded profile of the current and starting from the second gradient alteration time a third gradient alteration time is detected where the gradient of the recorded profile of the current changes more than a third given threshold, and the diagnostic value is determined dependent from the third gradient alteration time. A drift of the third gradient alteration time—in addition or alternatively to a drift of the first and/or the second gradient alteration time—may indicate an erroneous operation of the injection valve.

A third gradient of the recorded profile of the current between the second gradient alteration time and the third gradient alteration time is representative for a common movement of the armature and the valve needle.

This has the advantage that a further gradient alteration may be used to detect a long-term drift of the injection valve during the opening process of the valve needle, in particular a long-term drift of the third gradient alteration time.

In a further embodiment the diagnostic value is determined dependent from the time difference between the starting time and the third gradient alteration time.

In one embodiment, the method comprises, for a first injection process, actuating the actuator unit by means of the predetermined voltage signal starting at the given starting time relative to a given crank shaft angle of the internal combustion engine and dependent from the first gradient alteration time and/or the second gradient alteration time adjusting an assignment rule for determining a signal duration time of the voltage signal for at least one further injection process. In other words, the diagnostic value is used for adjusting the assignment rule for determining the signal duration time of the voltage signal for the at least one further injection process.

This embodiment has the advantage that a drift of the behaviour of the injection valve during the opening of the valve needle and a drift of the dynamics of the injection valve may be compensated by adapting the signal duration time of the voltage signal for the actuation of the actuator unit. This has the advantage that the delivered amount of fuel of the injection valve may be adjusted. Consequently, a long term stability of the amount of fuel delivered by the injection valve may be achieved.

In one embodiment, the assignment rule for determining the signal duration time of the voltage signal is adjusted dependent from the time difference between the starting time and the first gradient alteration time and/or the time difference between the starting time and the second gradient alteration time.

In a further embodiment, dependent from the first gradient alteration time and/or the second gradient alteration time, an assignment rule for determining a phase shift of the voltage signal relative to the given crank shaft angle is adjusted for at least one further injection process. This has the advantage that a drift of the behaviour of the injection valve during the opening of the valve needle and a drift of the dynamics of the injection valve may be compensated by adjusting the voltage signal relative to the given crank shaft angle.

According to one embodiment, the method comprises, for a first injection process, actuating the actuator unit by means of the predetermined voltage signal starting at the given starting time relative to a given crank shaft angle of the internal combustion engine, and dependent from the first gradient alteration time and/or the second gradient alteration time adjusting an assignment rule for determining a phase shift of the voltage signal relative to the given crank shaft angle for at least one further injection process. In other words, the diagnostic value is used for adjusting the assignment rule for determining the phase shift of the voltage signal relative to the given crank shaft angle for the at least one further injection process.

This embodiment has the advantage that a drift of the behaviour of the injection valve during the opening of the valve needle and a drift of the dynamics of the injection valve may be compensated by adjusting the voltage signal relative to the given crank shaft angle.

In one embodiment, the assignment rule for determining the time shift of the voltage signal relative to the given crank shaft angle is adjusted dependent from the time difference between the starting time and the first gradient alteration time and/or the time difference between the starting time and the second gradient alteration time.

FIG. 1 shows an injection valve 10 that is in particular suitable for dosing fuel to an internal combustion engine. The injection valve 10 comprises in particular an inlet tube 12.

The injection valve 10 comprises a valve body 14 with a central longitudinal axis L. A cavity 18 is arranged in the valve body 14. The injection valve 10 has a housing 16. The cavity 18 takes in a valve needle 20 and an armature 22. The valve needle 20 and the armature 22 are axially movable in the cavity 18.

A spring 24 is arranged in a recess 26 which is provided in the inlet tube 12. The spring 24 is mechanically coupled to the valve needle 20. The valve needle 20 forms a first seat for the spring 24.

A filter element 30 is arranged inside the inlet tube 12 and forms a further seat for the spring 24. During the manufacturing process of the injection valve 10 the filter element 30 can be axially moved into the inlet tube 12 in order to preload the spring 24 in a desired manner. By this the spring 24 exerts a force on the valve needle 20 towards an injection nozzle 34 of the injection valve 10.

In a closing position of the valve needle 20 it sealingly rests on a seat plate 32 by this preventing a fluid flow through the at least one injection nozzle 34. The injection nozzle 34 may be, for example, an injection hole.

The valve 10 is provided with an actuator unit 36 that is preferably an electro-magnetic actuator. The electro-magnetic actuator unit 36 comprises a coil 38, which is preferably arranged inside the housing 16. Furthermore, the electro-magnetic actuator unit 36 comprises the armature 22. The valve body 14, the housing 16, the inlet tube 12 and the armature 22 are forming an electromagnetic circuit.

A fluid outlet portion 40 is a part of the cavity 18 near the seat plate 32. The fluid outlet portion 40 communicates with a fluid inlet portion 42 which is provided in the valve body 14.

In the following the function of the injection valve 10 will be described:

Initially the fluid is led through the filter element 30 to the fluid inlet portion 42 and further towards the fluid outlet portion 40. The valve needle 20 prevents a fluid flow through the fluid outlet portion 40 in a closing position of the valve needle 20. Outside of the closing position of the valve needle 20, the valve needle 20 enables the fluid flow through the fluid outlet portion 40.

In the case when the electro-magnetic actuator unit 36 with the coil 38 gets energized the actuator unit 36 may affect an electro-magnetic force on the armature 22. The armature 22 is attracted by the electro-magnetic actuator unit 36 with the coil 38 and moves in axial direction away from the fluid outlet portion 40. Due to the mechanical coupling between the armature 22 and the valve needle 20 the armature 22 takes the valve needle 20 with it. Consequently, the valve needle 20 moves in axial direction out of the closing position. Outside of the closing position of the valve needle 20 a gap between the seat plate 32 and the valve needle 20 forms a fluid path and fluid can pass through the injection nozzle 34.

In the case when the actuator unit 36 is de-energized the spring 24 can force the valve needle 20 to move in axial direction towards the injection nozzle 34. Consequently, the valve needle 20 may be forced to move in its closing position. It is depending on the force balance between the force on the valve needle 20 caused by the actuator unit 36 with the coil 38 and the force on the valve needle 20 caused by the spring 24 whether the valve needle 20 is in its closing position or not.

Figure 2:
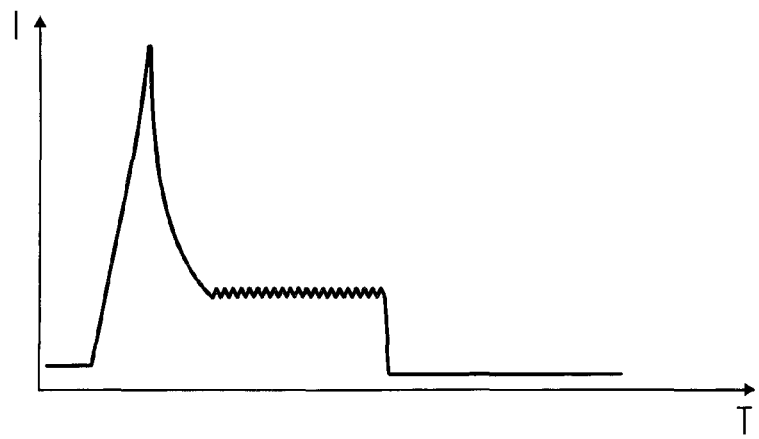
FIG. 2 shows an example current profile of the injection valve.
Figure 3:
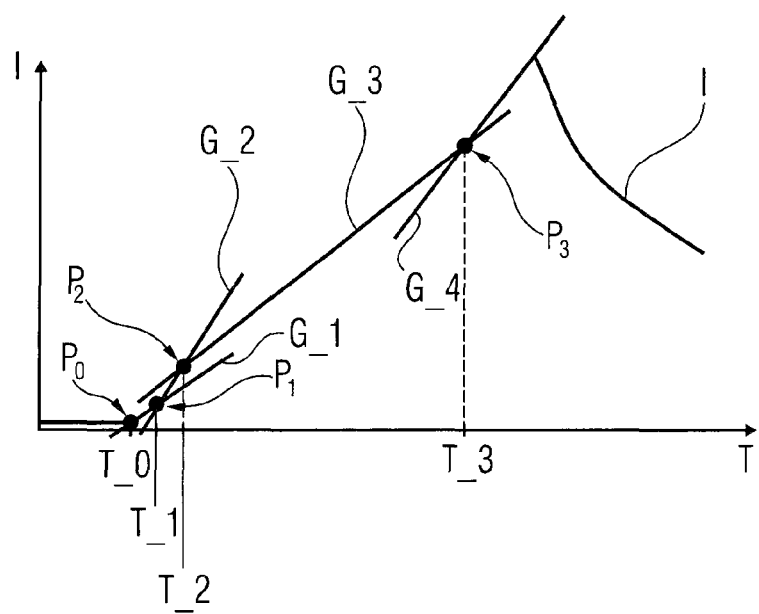
FIG. 3 shows an enlarged example current profile of the injection valve.
Figure 4:
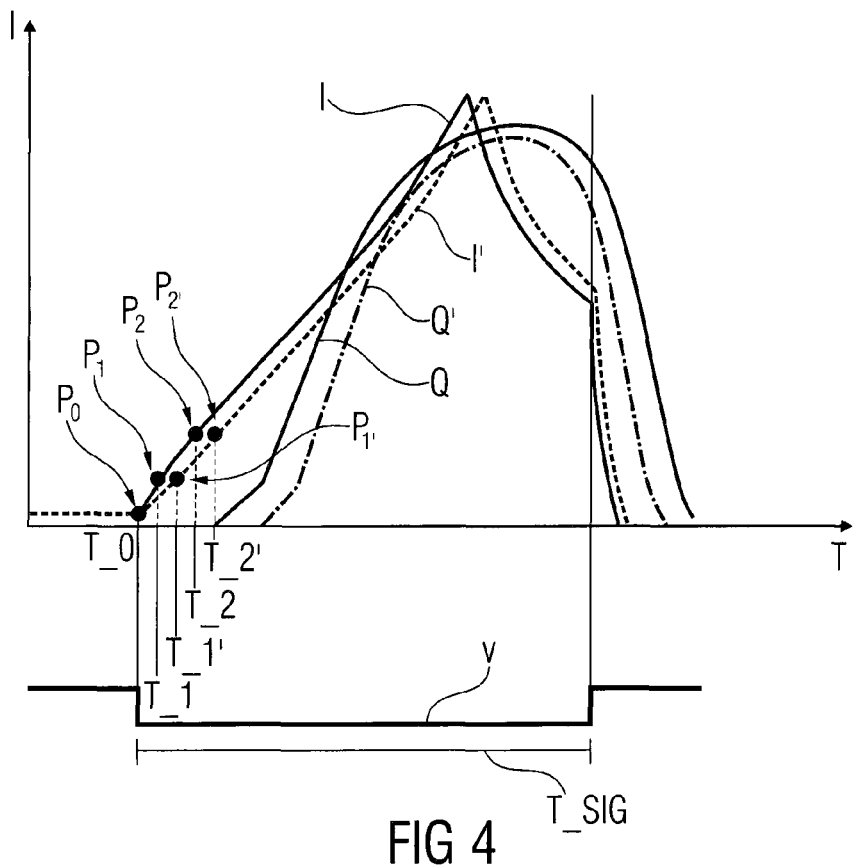
FIG. 4 shows a further enlarged example current profile and a profile of injected fluid of the injection valve.

FIGS. 2 to 4 show profiles of currents I, I' through the actuator unit 36 of the injection valve 10 to illustrate the method for monitoring the injection valve 10 and the method for operating the injection valve 10. Furthermore, FIG. 4 shows profiles of fluid quantities Q, Q' delivered by the injection valve 10.

The method for monitoring an opening of the injection valve 10 and for operating the injection valve 10 according to an exemplary embodiment comprises the following steps:

The actuator unit 36 is actuated by a predetermined voltage signal V which starts at a starting time T_0 (point P0). A time-dependent profile of the current I through the actuator unit 36 is recorded. The time-dependent profile of the current I is shown in FIG. 2. Detailed enlargements of this profile are shown in FIGS. 3 and 4.

The starting time T_0 is phased with operating conditions given by the combustion engine.

Between the starting time T_0 and a first gradient alteration time T_1 (point P1) a first gradient G_1 of the profile of the current I is detected. At the first gradient alteration time T_1 the gradient of the recorded profile of the current I changes more than a first given threshold. The first gradient G_1 is representative for an energization of the coil 38 between the starting time T_0 and the first gradient alteration time T_1.

Between the first gradient alteration time T_1 and a second gradient alteration time T_2 (point P2) a second gradient G_2 of the profile of the current I is detected. At the second gradient alteration time T_2 the gradient of the recorded profile of the current I changes more than a second given threshold. The second gradient G_2 is representative for a movement of the armature 22 prior to engage the valve needle 20. At the second gradient alteration time T_2 the gradient of the recorded profile of the current I changes again. The second gradient alteration time T_2 is representative for an engagement of the armature 22 with the valve needle 20 and a start of an opening movement of the valve needle 20.

Between the second gradient alteration time T_2 and a third gradient alteration time T_3 (point P3) a third gradient G_3 of the profile of the current I is detected. At the third gradient alteration time T_3 the gradient of the recorded profile of the current I changes more than a third given threshold. The third gradient G_3 is representative for a common movement of the armature 22 and the valve needle 20. The third gradient alteration time T_3 is representative for a complete opening of the valve needle 20 at its maximum lift position. After the third gradient alteration time T_3 a fourth gradient G_4 of the profile of the current I is detected.

The method allows identifying the different positions of the armature 22 or common positions of the armature 22 and the valve needle 20. Due to this method it is possible for an injection valve 10 to exactly detect the movement of the armature 22 and the movement of the armature 22 combined with the valve needle 20. In particular, it is possible to detect the exact beginning and end of each individual movement of the armature 22 and the valve needle 20 by the gradient changes of the current profile.

In the case of an aged injection valve 10 the drift shows a delay of the time T_1' (point P1'), which is representative for the beginning of the movement of the armature 22. This delayed initial movement of the armature 22 introduces a delay of the movement of the needle 20 (point P2' at the time T_2'). By this the fluid quantity Q' delivered by the aged injection valve 10 with the time drift may be smaller than the original fluid quantity Q of the original injection valve 10 as shown in FIG. 4.

The drifts may be used to generate a diagnostic which, in turn, may be used for compensating for the reduced fluid quantity Q' of the injection valve (10). For example, the diagnostic value may be used for adjusting the voltage signal V, in particular at least one of the starting time T_0, the shape, and the duration of the voltage signal V.

Figure 5:
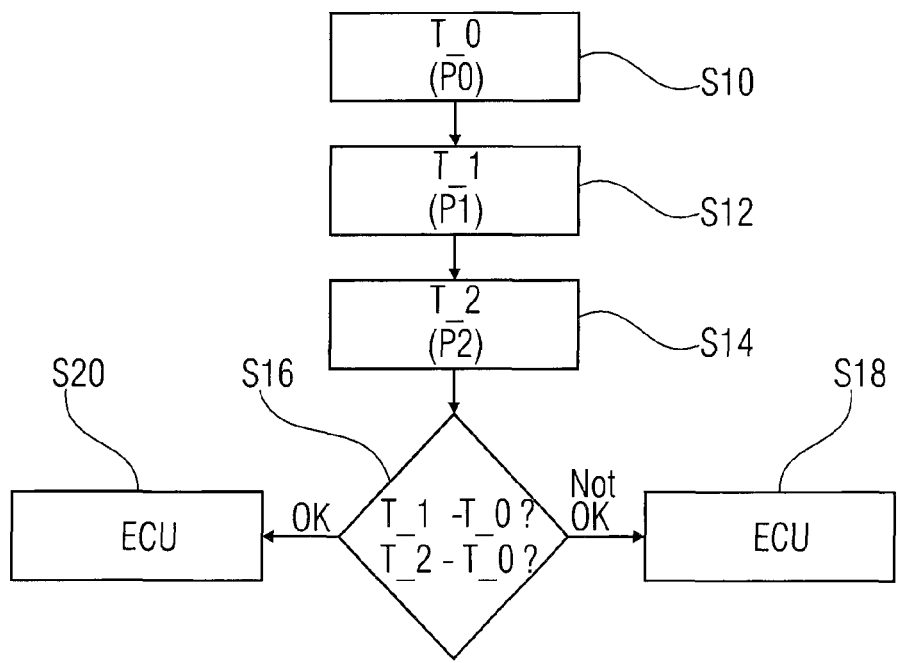
FIG. 5 is a flow chart of an example embodiment of the method for operating the injection valve.

FIG. 5 shows a flowchart to illustrate a further embodiment of the method for operating the injection valve 10. The method comprises the following steps:

In a first step S10 the actuator unit 36 is actuated by the predetermined voltage signal V starting at the starting time T_0 relative to a given crank shaft angle of the internal combustion engine. The time-dependent profile of the current I for the actuator unit 36 is recorded.

In a further step S12 the first gradient G_1 of the recorded profile of the current I which is representative for an energization of the coil 38 and the first gradient alteration time T_1 where the gradient of the recorded profile of the current I changes are detected.

In a further step S14 the second gradient G_2 of the profile of the current I which is representative for a movement of the armature 22 separate from the valve needle 20 and the second gradient alteration time T_2 are detected.

In a further step S16 time differences between the starting time T_0 and the first gradient alteration time T_1 and/or between the starting time T_0 and the second gradient alteration time T_2 are calculated. Furthermore, it is checked and verified if compensation is necessary by adapting the voltage signal V. If the time differences between the starting time T_0 and the first gradient alteration time T_1 and/or the starting time T_0 and the second gradient alteration time T_2 exceed given values the drift of the points P1, P2 may be compensated. An electronic control unit ECU may calculate the difference from the original data and may compensate the drift (step S18). In one embodiment of the method for operating the injection valve an assignment rule for determining the signal duration time T_SIG of the voltage signal V is adjusted dependent from the time difference between the starting time T_0 and the first gradient alteration time T_1 and/or the starting time T_0 and the second gradient alteration time T_2. In a further embodiment of the method for operating the injection valve 10 an assignment rule for determining a phase shift of the voltage signal V relative to the given crank shaft angle is adjusted so that a drift in particular of the first gradient alteration time T_1 and/or the second gradient alteration time T_2 may be compensated. By this the injection time may be adapted during a ballistic operating condition of the injection valve 10. By this, a corrected quantity Q of fluid may be delivered.

If the time difference between the starting time T_0 and the first gradient alteration time T_1 and the time difference between the starting time T_0 and the second gradient alteration time T_2 does not exceed given values the previous data are used (step 20).

Changes of the times T_1, T_2 and T_3 due to variable operating conditions or due to lifetime performance degradation are detectable and a specific algorithm could be applied to compensate the drift of the injection valve 10 or to reduce a variability between different cylinders of the combustion engine. A software program may modify injection parameters to compensate the drift and keep constant the delivered fuel quantity during the lifetime of the injection valve 10. By this method it is possible to obtain a minimum of the lowest controllable and deliverable fuel quantity including a predictable ballistic operating condition of the injection valve 10 after the second gradient alteration time T_2.

The invention is not limited to specific embodiments by the description on the basis of said exemplary embodiments but comprises any combination of elements of different embodiments. Moreover, the invention comprises any combination of claims and any combination of features disclosed by the claims.

What is claimed is:

1. A method for operating an injection valve that includes a valve body with a cavity comprising a fluid outlet portion, a valve needle movable in the cavity and preventing a fluid flow through the fluid outlet portion in a closing position and releasing the fluid flow through the fluid outlet portion in further positions, and an actuator unit with a coil and an armature, the armature being movable in the cavity and configured to actuate the valve needle, the method comprising:

actuating the actuator unit by applying a predetermined voltage signal starting at a given starting time, recording a time-dependent profile of a current through the actuator unit, based on the recorded profile of the current and starting from the starting time detecting a first gradient alteration time at which a gradient of the recorded profile of the current changes more than a first given threshold, wherein the gradient between the starting time and the first gradient alteration time represents an energization of the coil, based on the recorded profile of the current and starting from the first gradient alteration time, detecting a second gradient alteration time at which a gradient of the recorded profile of the current changes more than a second given threshold, wherein the gradient between the first gradient alteration time and the second gradient alteration time representat a movement of the armature alone, based on the recorded profile of the current and starting from the second gradient alteration time, detecting a third gradient alteration time at which a gradient of the recorded profile of the current changes more than a third given threshold, wherein the gradient between the second gradient alteration time and the third gradient alteration time represents a common movement of the armature and the valve needle, and calculating a diagnostic value based on (a) at least one of the first gradient alteration time and the second gradient alteration time, and (b) the third gradient alteration time, and compensating a long-term drift of the injection valve based on the calculated diagnostic value.

2. The method of claim 1, wherein the diagnostic value is calculating based on at least one of (a) a time difference between the starting time and the first gradient alteration time and (b) a time difference between the starting time and the second gradient alteration time.

3. The method of claim 1, wherein the diagnostic value is calculating based on a time difference between the starting time and the third gradient alteration time.

4. The method of claim 1, wherein:
the injection valve is an injection valve of an internal combustion engine,
for a first injection process, the starting time is based on a given crank shaft angle of the internal combustion engine, and
the calculated diagnostic value is used for adjusting an assignment rule for determining a signal duration time of the voltage signal for at least one further injection process.

5. The method of claim 4, comprising adjusting the assignment rule for determining the signal duration time of the voltage signal based on at least one of (a) a time difference between the starting time and the first gradient alteration time and (b) a time difference between the starting time and the second gradient alteration time.

6. The method of claim 4, comprising adjusting an assignment rule for determining a phase shift of the voltage signal relative to the given crank shaft angle for at least one further injection process, based on at least one of the first gradient alteration time and the second gradient alteration time.

7. The method of claim 1, wherein:
the injection valve is an injection valve of an internal combustion engine,
for a first injection process, the starting time is based on a given crank shaft angle of the internal combustion engine, and
the calculated diagnostic value is used for adjusting an assignment rule for determining a phase shift of the voltage signal relative to the given crank shaft angle for at least one further injection process.

8. The method of claim 6, comprising adjusting the assignment rule for determining the time shift of the voltage signal relative to the given crank shaft angle based on at least one of (a) a time difference between the starting time and the first gradient alteration time and (b) a the time difference between the starting time and the second gradient alteration time.

9. An injection system, comprising:
an injection valve comprising:
a valve body with a cavity comprising a fluid outlet portion,
a valve needle movable in the cavity and preventing a fluid flow through the fluid outlet portion in a closing position and releasing the fluid flow through the fluid outlet portion in further positions, and
an actuator unit with a coil and an armature, the armature being movable in the cavity and configured to actuate the valve needle, a control system comprising a processor and computer instructions stored in a non-transitory computer-readable medium and executable by the processor to:
actuate the actuator unit by applying a predetermined voltage signal starting at a given starting time,
record a time-dependent profile of a current through the actuator unit,
based on the recorded profile of the current and starting from the starting time, detect a first gradient alteration time at which a gradient of the recorded profile of the current changes more than a first given threshold, wherein the gradient between the starting time and the first gradient alteration time represents an energization of the coil,
based on the recorded profile of the current and starting from the first gradient alteration time, detect a second gradient alteration time at which a gradient of the recorded profile of the current changes more than a second given threshold, wherein the gradient between the first gradient alteration time and the second gradient alteration time representat a movement of the armature alone,
based on the recorded profile of the current and starting from the second gradient alteration time, detect a third gradient alteration time at which a gradient of the recorded profile of the current changes more than a third given threshold, wherein the gradient between the second gradient alteration time and the third gradient alteration time represents a common movement of the armature and the valve needle, and
calculate a diagnostic value based on (a) at least one of the first gradient alteration time and the second gradient alteration time, and (b) the third gradient alteration time, and
compensate a long-term drift of the injection valve based on the calculated diagnostic value.

10. The injection system of claim 9, wherein the control system is configured to calculate the diagnostic value based on at least one of (a) a time difference between the starting time and the first gradient alteration time and (b) a time difference between the starting time and the second gradient alteration time.

11. The injection system of claim 9, wherein the control system is configured to calculate the diagnostic value based on a time difference between the starting time and the third gradient alteration time.

12. The injection system of claim 9, wherein:
the injection valve is an injection valve of an internal combustion engine,
for a first injection process, the starting time is based on a given crank shaft angle of the internal combustion engine, and
the control system is configured to adjust an assignment rule for determining a signal duration time of the voltage signal for at least one further injection process, based on the calculated diagnostic value.

13. The injection system of claim 12, wherein the control system is configured to adjust the assignment rule for determining the signal duration time of the voltage signal based on at least one of (a) a time difference between the starting time and the first gradient alteration time and (b) a time difference between the starting time and the second gradient alteration time.

14. The injection system of claim 12, wherein the control system is configured to adjust an assignment rule for determining a phase shift of the voltage signal relative to the given crank shaft angle for at least one further injection process, based on at least one of the first gradient alteration time and the second gradient alteration time.

15. The injection system of claim 9, wherein:
    the injection valve is an injection valve of an internal combustion engine,
    for a first injection process, the starting time is based on a given crank shaft angle of the internal combustion engine, and
    the control system is configured to adjust an assignment rule for determining a phase shift of the voltage signal relative to the given crank shaft angle for at least one further injection process.

16. The injection system of claim 15, wherein the control system is configured to adjust the assignment rule for determining the time shift of the voltage signal relative to the given crank shaft angle based on at least one of (a) a time difference between the starting time and the first gradient alteration time and (b) a the time difference between the starting time and the second gradient alteration time.

* * * * *